United States Patent [19]

Ohtsuka et al.

[11] 4,199,472

[45] Apr. 22, 1980

[54] OXYGEN ABSORBENT COMPOSITION

[75] Inventors: Sadao Ohtsuka, Nagareyama; Takaaki Yamaguchi, Tokyo, both of Japan

[73] Assignee: Mitsubishi Gas Chemical Company Inc., Tokyo, Japan

[21] Appl. No.: 816,135

[22] Filed: Jul. 15, 1977

[30] Foreign Application Priority Data

Jul. 15, 1976 [JP] Japan ................................. 51/84168

[51] Int. Cl.² ........................ B01J 31/02; B01J 27/02; C09K 3/00; C01B 17/66
[52] U.S. Cl. .................................. 252/427; 252/428; 252/439; 252/188; 423/515; 423/221
[58] Field of Search ............... 252/427, 428, 188, 439; 423/515, 221

[56] References Cited

U.S. PATENT DOCUMENTS

| | | | |
|---|---|---|---|
| 2,109,708 | 3/1938 | Pfister | 252/188 |
| 2,825,651 | 3/1958 | Loo et al. | 252/188 X |
| 3,433,590 | 3/1969 | Weele et al. | 252/188 X |
| 3,677,699 | 7/1972 | Fujiwara et al. | 423/515 |
| 3,985,674 | 10/1976 | Ellis et al. | 423/515 X |

*Primary Examiner*—Delbert E. Gantz
*Assistant Examiner*—William G. Wright
*Attorney, Agent, or Firm*—Frishauf, Holtz, Goodman & Woodward

[57] ABSTRACT

An oxygen absorbent composition consisting essentially of (a) an oxygen absorbent comprising a dithonite as a main component and (b) a fiber material in an amount of from about 1 to about 50 parts by weight per 100 parts by weight of the oxygen absorbent and a process for producing the same are disclosed.

20 Claims, No Drawings

OXYGEN ABSORBENT COMPOSITION

BACKGROUND OF THE INVENTION

This invention relates to an oxygen absorbent composition consisting essentially of (a) an oxygen absorbent comprising a dithionite as a main component and (b) a fiber component which is usable for preserving foodstuffs, etc., and particularly relates to an oxygen absorbent capable of being tableted.

In order to preserve foodstuffs, such as vegetable, fish, shellfish, meats, processed foodstuffs, such as potato chips, cakes, peanuts, etc., and so on, it is necessary to prevent the foodstuffs from getting moldy and from putrefying. Prior art methods have used freezer storage, cold storage, vacuum packaging and replacing the gas present in the inner part of packaging by an inert gas for preventing foodstuffs from getting moldy and putrefying. Additives, such as antioxidant, have been used for preserving foodstuffs. Recently, governments have started to regulate the use of additives for food, since it is realized that some additives are injurious to humans. The freezer storage method requires large-scale apparatus and complicated operation, so the freezer storage method is costly.

Molds or eumycetes, bacterias and higher organisms such as insects tend to disturb preservation of foodstuffs. These mold eumycetes, bacterias and insects live and grow in the presence of oxygen and cause putrefaction and change in quality of foodstuffs.

Therefore, if oxygen can be selectively removed from the atmosphere in which the foodstuffs are packed, the problems of putrefaction and change in quality of foodstuffs can be overcome, and it will become possible to preserve foodstuffs for a long time.

Attempts for producing such an oxygen absorbent have previously been made.

A prior art oxygen absorbent comprising a dithionite as a main component is known. For example, Japanese Patent Application Nos. 144418/1975, 3539/1976 and 27792/1976 and U.S. Ser. No. 760,817 filed on Jan. 19, 1977 now U.S. Pat. No. 4,104,192 issued Aug. 1, 1978 (all these patent applications were assigned to the assignee of this invention.) disclose an oxygen absorbent comprising a dithionite, an alkaline material, water (including water of hydration or water of crystallization) of an alcohol and an adsorbent, such as activated carbon. In the oxygen absorbent, the alkaline material absorbs $SO_2$ formed by reacting the dithionite with oxygen; and the adsorbent, such as activated carbon acts as a deodorizer. When an alcohol is used in place of water, an oxygen absorbent having a slow absorbing rate is obtained. When an oxygen absorbent is applied to water-containing foodstuffs, that is, when compounds having water of crystallization is used, or when the absorbent is used with water-containing foodstuffs, or water-generating materials, free water or an alcohol is not necessarily contained in the absorbent, because nearly saturated water vapor is present in a closed system containing these materials.

The known oxygen absorbents are all powdery and in use a permeable paper bag is filled with the absorbent. The present inventors found that the known oxygen absorbents have the following shortcomings:

(a) In using the oxygen absorbent with foodstuffs, if the paper bag is broken, the absorbent powder scatters and there is possibility of contaminating the foodstuffs.

(b) When the absorbent is used with foodstuffs in an atmosphere containing much water vapor or much moisture, the paper bag is likely to be weakened and broken, whereby the use of the absorbent is much limited.

(c) When the absorbent is used with foodstuffs having oils on the surface thereof, for example potato chips, the paper bag tends to be weakened and broken by action of the oils, whereby the use of the absorbent is much limited.

(d) In case of storing a large amount of foodstuffs by removing oxygen in the atmosphere of the foodstuffs by forced contact of the atmosphere with a large amount of an oxygen absorbent, heat generated through the deoxygenation reaction accumulates, because the absorbent is powdery, and there is risk that the vapor generated by accumulation of heat and gas generated by decomposition of the components will impair the foodstuffs.

(e) Since the powdery absorbent has small bulk specific gravity—that is, it is bulky, a large bag is required for packing the absorbent. In other words, a large volume of the absorbent is required for absorbing a definite amount of oxygen. This is uneconomical.

Therefore, it is necessary to tablet the oxygen absorbent for overcoming such shortcomings. The tableting must not impair the deoxygenating action of the dithionite.

In general, tableting process are of two types; dry and wet.

There are two kinds of wet process, as follows:

A. (a) powderizing, (b) mixing the powder with water, (c) granulating, (d) drying, and (e) tableting.

B. (a) powderizing, (b) mixing the powder with water, (c) tableting, and (d) drying.

There are two kinds of dry process, as follows:

C. (a) powderizing, (b) slug-tableting, (c) granulating, (d) sieving, and (e) tableting.

D. (a) powderizing and (b) tableting.

When a large amount of water is added to the oxygen absorbent composed of a dithionite, or when the oxygen absorbent is forcedly contacted with air or is dried, the inherent action or the oxygen-absorbing ability of the oxygen absorbent is impaired. Therefore, tableting of the oxygen absorbent by the wet processes is not preferred.

Therefore, in order to tablet the oxygen absorbent containing a dithionite, tableting of the oxygen absorbent by the dry process is preferred. Also, since the oxygen absorbent is chemically active, it is preferred to simplify the steps for tableting the powder. In the dry tableting process, whether the powder can be tableted and the selection of appropriate binders are the problems. In fact, when the known powdery oxygen absorbent containing a dithionite is tableted without using any binder, tablets having the strength required to resist the handling can not be obtained.

For both the dry and wet tableting processes, the binders employed for tableting the powdery oxygen absorbent include, for example, solid binder, such as carboxymethyl cellulose (CMC), potash alum, sodium aliginate, polyvinyl alcohol powder, starch, gum arabic, bentonite, zeolite, gelatin, sodium polyphosphate, sodium metaphosphate, sodium borate, rosin, powderous alcohols and the like; and liquid binders, such as monohydric alcohol, water, ethylene glycol, propylene glycol, diethylene glycol, water-glass, glycerine, liquid paraffins, oils, high molecular alcohols and the like.

However, the present inventors found that, even in case of tableting the oxygen absorbent containing a dithionite using any of these binders, the good results can not be obtained. That is, in case of tableting the absorbent using any of these binders, tablets having a hardness of more than 5-6 kg required to resist handling the tablet can not be obtained. Even if a tablet having such handling strength is obtained, the resulting tablet is fragile due to capping phenomenon, and is not practical. The edge of the tablet so obtained is likely to be chipped and the tablet is not glossy. In the tableting by continuous tableting machine, the powder compressed on the mold forms a membrane which adheres to the surface of the mold, and the membrane hinders the continuous tableting operation. Therefore, the known binders are not usable for tableting the oxygen absorbent containing a dithionite.

SUMMARY OF THE INVENTION

The present inventors attempted to find an appropriate binder for tableting such oxygen absorbent. As a result, we found an oxygen absorbent composition capable of being tableted, which can overcome these disadvantages.

This invention relates to an oxygen absorbent composition consisting essentially of (a) 100 parts by weight of an oxygen absorbent comprising a dithionite as a main component (b) from about 1 part to about 50 parts by weight of at least one fiber material.

This invention relates to a process for tableting an oxygen absorbent comprising a dithionite as a main component, characterized by mixing 100 parts by weight of the oxygen absorbent and about 1 part to about 50 parts by weight of at least one fiber material and compressing the mixture.

DETAILED DESCRIPTION OF THE INVENTION

The oxygen absorbent comprising a dithionite as a main component may comprise an anhydrous dithionite and water (including water of crystallization) or an alcohol and optionally an alkaline material and/or activated carbon as an absorbent. Such an oxygen absorbent was used for preserving fresh foodstuffs, such as vegetables, for preventing rancidity of fats and oils and for antioxidizing metals and organic chemicals.

The oxygen absorbent may contain neither water nor alcohols when the oxygen absorbent is used with water-containing foodstuffs.

The term "alcohols" means compounds having at least one alcoholic hydroxy group. Alcohols having poor volatility, such as alkylene glycol, glycerine, and their alkyl derivatives are preferred.

The oxygen absorbent may comprise a dithionite, a compound having water of crystallization and an alkaline material and/or activated carbon. Examples of compound having water of crystallization include sodium carbonate decahydrate or heptahydrate and sodium sulfate decahydrate or heptahydrate. Other compounds having water of crystallization are disclosed in the above mentioned U.S. Ser. No. 760,817. The alkaline materials include a variety of compounds; and hydroxides or carbonates of alkaline metals or alkali earth metals are preferred.

The term "oxygen absorbent" in the specification and the claims means an agent for removing oxygen. The fiber materials employed in the present invention include a variety of materials. The fiber material may be single material or mixture. Pulp, cellulose and mixture thereof are preferred. Considering the mixing property of the fiber material with the oxygen absorbent and the strength of the tablet, powdery pulp and powdery cellulose are more preferred. Powdery pulp and powdery cellulose in which more than 90% of the powder passes through 50 mesh (Tyler Standard Siene) and less than 60% of the powder passes through 250 mesh are appropriate. Powdery cellulose containing an amorphous portion is appropriate. The sieve employed in this invention was Tyler Standard Sieve.

The amount of the fiber material employed is in the range of from about 1 part to about 50 parts by weight, preferably from about 1 part to about 10 parts by weight, most preferably from about 3 parts to about 5 parts by weight per 100 parts by weight of the oxygen absorbent.

In tableting the oxygen absorbent of this invention, the tableting process and tableting conditions are not critical. The compression ratio, namely the ratio of volume of post-tableting to that of pre-tableting may profitably be in the range of from $\frac{1}{4}$ to 1/2.5. The shape of the tablet and the size thereof are not critical. In general a tablet may have cross section of circle or ellipse, a diameter of less than 30 mm and a thickness of less than 8 mm.

The tablets obtained by tableting the oxygen absorbent of this invention have great strength and are practical. The tablets have the following advantages:

(a) The surface is smooth and glossy.

(b) The tablets are not chipped or powderized in handling.

(c) The edge of the tablets is clear, and the appearance thereof is clear.

(d) Even in case of continuously tableting the composition for mass production, membrane is not formed on the surface of the mold so as to hinder continuous operation.

Also the oxygen absorbent of this invention can be tableted withoutkl impairing the quality of the oxygen absorbent. The tablets so obtained have the same oxygen-absorbing ability as the powdery oxygen absorbent. In the tablets made from the present composition, the oxygen-absorbing rate can be adjusted by varying the water content in the composition as in the powdery oxygen absorbent.

The oxygen absorbent in the shape of tablet obtained by tableting the oxygen absorbent of this invention has the following advantages in comparison with the powdery oxygen absorbent:

(1) Since the tableted oxygen absorbent has a large bulk specific gravity, that is, is not bulky, a small bag is sufficient for packing the tableted absorbent.

In other words, small quantity of the tableted absorbent is sufficient for absorbing a definite amount of oxygen. This is economical.

(2) When the tableted oxygen absorbent is used with foodstuffs, paper bag is not broken. Therefore, since the absorbent does not scatter, there is no possibility of contaminating the foodstuffs.

(3) In case of using a large amount of the powdered oxygen absorbent, heat generated through the deoxygenation reaction accumulates. The heat accumulated further promotes the deoxygenation reaction, whereby the dithionite results in being intensely decomposed. This loses the inherent action of the oxygen absorbent. However, in case of using the tableted oxygen absorbent, heat is not accumulated due to the heat dissipation from the space present between the tablets. Therefore, the dithionite is not intensely decomposed.

The present invention is further illustrated by the following Examples and Comparative Examples. However, this invention should not be limited by these examples and comparative examples. The percent and parts in the examples are based on weight unless otherwise specified.

EXAMPLE 1

The oxygen absorbent consisting of 3 gr of anhydrous sodium dithionite 85% pure which are sold by Mitsubishi Gas Chemical Company Inc., 0.8 gr of particulate activated carbon (particle size 80–100 mesh), 12 gr of calcium hydroxide and 0.30 gr of $Na_2SO_4/10H_2O$ was prepared. 0.5 Gr of powdery pulp as a binder in which more than 90% of the pulp passes through 50 mesh and less than 10% of the pulp passes through 250 mesh and 0.2 gr of magnesium stearate as a lubricant were added to the absorbent under a nitrogen atmosphere; and the resulting mixture was uniformly mixed. The resulting composition was placed in a mold having 50 mm diameter so as hot to contact it with air, and was compressed to the compression ratio of 1/3 and the thickness of 5 mm for 1 second at pressure of 1000 kg/cm$^2$ by using hydraulic press. The surface of the tablets thus obtained was smooth and glossy. The tablets were not chipped, so they were not powderized in handling them. The edge of the tablets was clear, and the appearance thereof was also good. The hardness of the tablets was 14 kg, when it was measured by using Kiya-type hardness meter.

The tablets so obtained were placed in a triangular flask filled with air and the tablets were sealed therein. After 24 hours passed, the oxygen concentration was zero. Then sulfite gas concentration was less than 1 ppm. The value was the same as that in the powdery oxygen absorbent.

COMPARATIVE EXAMPLE 1

The procedure of Example 1 was repeated except that gum arabic, CMC (carboxymethyl Cellulose) or starch was used in place of powdery pulp. The resulting tablets had 4.3 kg, 4.6 kg and 2.5 kg, respectively. In using the starch, capping phenomenon was detected.

EXAMPLE 2

The oxygen absorbent consisting of 3 gr of anhydrous sodium dithionite 85% pure, 0.8 gr of particulate activated carbon (particle size is 80–100 mesh), 12 gr of calcium hydroxide and 0.30 gr of sodium sulfate decahydrate was prepared. 0.6 Gr of powdery cellulose as a binder in which more than 90% of the cellulose passes through 50 mesh and less than 10% of the cellulose passes through 250 mesh and 0.3 gr of talc as a lubricant were added to the absorbent under a nitrogen atmosphere; and the resulting mixture was uniformly mixed. The resulting composition was placed in mold having 50 mm diameter so as not to contact it with air, and was compressed to the compression ratio of 1/3 and the thickness of 5 mm for 1 second at pressure of 2000 kg/cm$^2$ by using hydraulic press. The surface of the tablets thus obtained was smooth and glossy. The tablets were not chipped, so they were not powderized in handling them. The edge of the tablets was clear, and appearance thereof was also good. The hardness of the tablets was 8 kg, when it was measured by using Kiya-type hardness meter.

The tablets so obtained were placed in a triangular flask filled with air and the tablets were sealed therein. After 72 hours passed, the oxygen concentration was zero. The sulfite gas concentration was less than 1 ppm. The value was the same as that in the powdery oxygen absorbent.

EXAMPLE 3

An oxygen absorbent consisting of 3 gr of anhydrous sodium dithionite 85% pure, 0.8 gr of particulate activated carbon (particle size is 80–100 mesh), 12 gr of calcium hydroxide and 2 gr of ethylene glycol was prepared. The tablets were prepared using the oxygen absorbent so obtained as in Example 2 except that 0.3 gr of magnesium stearate was used as a lubricant. The tablets had gloss, appearance and strength as in Example 2. After 48 hours passed, the oxygen concentration was zero.

EXAMPLE 4

The oxygen absorbent consisting of 3 gr of anhydrous sodium dithionite 85% pure, 0.8 gr of particulate activated carbon (particle size is 80–100 mesh), 8 gr of magnesium hydroxide and 1 gr of sodium sulfate decahydrate was prepared. 0.5 Gr of the cellulose employed in Example 2 as a binder and 0.2 gr of barium stearate as a lubricant were added to the absorbent in a nitrogen atmosphere; and the resulting mixture was uniformly mixed. The resulting composition was tableted and was examined as in Example 2. The tablets having gloss and appearance as in Example 2 were obtained. Their hardness was 8 kg. After 48 hours passed, the oxygen concentration was zero.

EXAMPLE 5

The oxygen absorbent consisting of 3 gr of anhydrous sodium dithio 85% pure, 0.8 gr of particulate activated carbon (particle size is 80–100 mesh), 12 gr of calcium hydroxide and 0.5 gr of ferrous sulfate heptahydrate was prepared. 0.6 Gr of the pulp employed in Example 1 as a binder and 0.3 gr of magnesium stearate as a lubricant were to the absorbent under a nitrogen atmosphere; and the resulting mixture was uniformly mixed. The resulting composition was tableted and was examined as in Example 2. The tablets having a glossy appearance and hardness as in Example 2 were obtained. After 48 hours passed, the oxygen concentration was zero.

EXAMPLES 6–14

To each of the oxygen absorbents as given in Table 1 was added 0.5 gr of the powdery pulp employed in Example 1 and 0.2 gr of magnesium stearate. Each of the resulting mixtures was uniformly mixed and was tableted. The tablets were tested as in Example 1.

Table 1

| Ex. No. | anhydrous sodium dithionite 85% pure (g) | water source | alcohols | alkaline materials | activated carbon (80–100 mesh) (g) | hardness (kg) |
|---|---|---|---|---|---|---|
| 6 | 3 | — | — | Ca(OH)$_2$ (12 g) | 0.8 | 8 |
| 7 | 7 | Na$_2$SO$_4$ . 10 H$_2$O (0.3 gr) | — | — | 8 | 7 |
| 8 | 7 | — | — | — | 8 | 7 |
| 9 | 3 | Na$_2$SO$_4$ . | — | Ca(OH)$_2$ | — | 13 |

Table 1-continued

| Ex. No. | anhydrous sodium dithionite 85% pure (g) | water source | alcohols | alkaline materials | activated carbon (80-100 mesh) (g) | hardness (kg) |
|---|---|---|---|---|---|---|
|  |  | 10 H₂O (0.30 gr) | (12 g) |  |  |  |
| 10 | 3 | — | — | Ca(OH)₂ (12 g) | — | 13 |
| 11 | 3 | water (0.15 g) | — | Ca(OH)₂ (12 g) | 0.8 | 9 |
| 12 | 7 | — | ethylene glycol (2 g) | — | 8 | 8 |
| 13 | 3 | — | ethylene glycol (2 g) | Ca(OH)₂ (12 g) | — | 12 |
| 14 | 3 | water (0.1 g) | ethylene glycol (0.1 g) | Ca(OH)₂ (12 g) | 0.8 | 9 |

The tablets obtained in Examples 7, 9, 11, 12, 13 and 14 exhibited the oxygen-absorbing ability as they are, whereas the tablets obtained in Examples 6, 8 and 10 exhibited the oxygen-absorbing ability only when they were used in a water vapor atmosphere.

What is claimed is:

1. An oxygen absorbent composition consisting essentially of (a) an oxygen absorbent comprising sodium dithionite as a main component and (b) at least one fiber material in an amount of from about 1 part to about 50 parts by weight per 100 parts by weight of the oxygen absorbent.

2. The oxygen absorbent composition as defined in claim 1 wherein the amount of the fiber material employed is in the range of from about 1 part to about 10 parts by weight per 100 parts by weight of the oxygen absorbent.

3. The oxygen absorbent composition as defined in claim 1 wherein the amount of the fiber material employed is in the range of from about 3 parts to about 5 parts by weight per 100 parts by weight of the oxygen absorbent.

4. The oxygen absorbent composition as defined in claim 1 wherein the fiber material is powdery pulp.

5. The oxygen absorbent composition as defined in claim 1 wherein the fiber material is powdery cellulose.

6. The oxygen absorbent composition as defined in claim 1 wherein the oxygen absorbent comprising sodium dithionite as a main component contains an anhydrous dithionite and water.

7. The oxygen absorbent composition as defined in claim 1 wherein the oxygen absorbent comprising sodium dithionite as a main component contains an anhydrous dithionite, water and at least one material selected from the group consisting of an alkaline material and activated carbon.

8. The oxygen absorbent composition as defined in claim 1 wherein the oxygen absorbent comprising sodium dithionite as a main component contains an anhydrous dithionite and an alcohol.

9. The oxygen absorbent composition as defined in claim 1 wherein the oxygen absorbent comprising sodium dithionite as a main component contains an anhydrous dithionite, an alcohol and at least one material selected from the group consisting of an alkaline material and activated carbon.

10. The oxygen absorbent composition as defined in claim 4 wherein more than 90% of the powdery pulp passes through 50 mesh and less than 60% of the pulp passes through 250 mesh.

11. The oxygen absorbent composition as defined in claim 5 wherein the powdery cellulose contains the amorphous portion.

12. The oxygen absorbent composition as defined in claim 5 wherein more than 90% of the cellulose passes through 50 mesh and less than 60% of the pulp passes through 250 mesh.

13. The oxygen absorbent composition as defined in claim 6 wherein the water is water of crystallization.

14. The oxygen absorbent composition as defined in claim 7 wherein the water is water of crystallization.

15. The oxygen absorbent composition as defined in claim 7 wherein the alkaline material is calcium hydroxide.

16. The oxygen absorbent composition as defined in claim 8 wherein the alcohol is selected from the group consisting of alkylene glycols, glycerine and its alkyl derivatives, and has at least one hydroxy group.

17. The oxygen absorbent composition as defined in claim 8 wherein the alcohol is ethylene glycol.

18. The oxygen absorbent composition as defined in claim 9 wherein the alcohol is selected from the group consisting of alkylene glycols, glycerine and its alkyl derivatives, and has at least one hydroxy group.

19. The oxygen absorbent composition as defined in claim 9 wherein the alcohol is ethylene glycol.

20. The oxygen absorbent composition as defined in claim 9 wherein the alkaline material is calcium hydroxide.

* * * * *